United States Patent [19]

Rebhan

[11] Patent Number: 5,049,330
[45] Date of Patent: Sep. 17, 1991

[54] PROCESS AND APPARATUS FOR THE PRODUCTION OF PLASTIC OBJECTS

[75] Inventor: Dieter Rebhan, Geretsried-Gelting, Fed. Rep. of Germany

[73] Assignee: Linde Aktiengesellschaft, Wiesbaden, Fed. Rep. of Germany

[21] Appl. No.: 543,869

[22] Filed: Jun. 26, 1990

[30] Foreign Application Priority Data

Jun. 27, 1989 [DE] Fed. Rep. of Germany ....... 3921046

[51] Int. Cl.$^5$ .............................. B29C 67/00
[52] U.S. Cl. ....................... 264/84; 264/37; 264/40.1; 264/40.3; 264/40.5; 264/41; 264/115; 264/126; 425/1
[58] Field of Search ............... 425/1; 264/84, 115, 264/126, 80, 37, 40.3, 40.5, 41, 45.1, 50, 40.1

[56] References Cited

U.S. PATENT DOCUMENTS

| 3,175,025 | 3/1965 | Geen et al. | 264/80 |
| 3,456,047 | 7/1969 | Vinton et al. | 264/80 |
| 3,645,521 | 2/1972 | Geen et al. | 425/1 X |
| 3,708,362 | 1/1973 | Winchcombe et al. | 156/82 |
| 4,106,970 | 8/1978 | Torbet et al. | 156/306 |
| 4,155,795 | 5/1979 | Torbet et al. | 156/381 |

Primary Examiner—Mary Lynn Theisen
Attorney, Agent, or Firm—Millen, White & Zelano

[57] ABSTRACT

A process and apparatus is provided for explosively forming plastic objects from shredded plastic such as recycled plastic having different compositions. The shredded plastic and an explosive gas mixture is introduced into a mold cavity having the shape of the object to be formed, and the gas mixture is ignited, generating sufficient heat and pressure to force the plastic to conform to the shape of the mold cavity. The temperature and pressure in the mold cavity is controlled during the explosion by releasing combustion gases from the mold cavity.

22 Claims, 1 Drawing Sheet

PROCESS AND APPARATUS FOR THE PRODUCTION OF PLASTIC OBJECTS

BACKGROUND OF THE INVENTION

The present invention relates, in general, to the production of plastic objects and, more particularly, to a process of forming plastic objects from shredded plastic, especially from mixtures of different types of recycled plastics.

THE PRIOR ART

A number of processes for the production of plastic objects are known. In some of these processes, the raw plastic is heated to its softening temperature and is then shaped. Known methods using this principle are casting, pressing, and blowing processes. Another processing principle used in shaping objects is based on the chemical reaction of several initial components, the actual plastic resulting only after the components are brought together. In such processes, the molding of an object can take place in this phase, e.g., foaming. Further, in the shaping or molding of granular types of material, it is known to use binding or adhesive agents.

All of these methods and processes have advantages and drawbacks, but a common drawback of all of these is that they are only suitable for use on a homogeneous initial material or else binding or adhesive agents are necessary to strength on the material being molded. Special technical difficulties and costs are associated with the processing of mixed initial materials. Therefore, there is a need to have available other processes for the production of plastic objects.

It is, therefore, an object of this invention to provide a process and associated apparatus for the production of plastic objects which is especially suitable for processing mixed plastic materials, and particularly recycled plastic materials.

Upon further study of the specification and appended claims, further objects and advantages of this invention will become apparent to those skilled in the art.

SUMMARY OF THE INVENTION

A process and apparatus is provided for the production of plastic objects from shredded plastic, such as recycled plastic materials, having different compositions. The shredded plastic is introduced into a mold corresponding to the shape of the object to be produced; an explosive, combustible gaseous mixture is also introduced into the mold; and the explosive gaseous mixture is ignited, thereby generating sufficient heat and pressure to fuse the plastic surfaces and bake together the plastic grains and shape the plastic to conform to the mold cavity. The amount of heat and pressure in the mold cavity can be controlled by the amount of explosive gaseous mixture used and by releasing or venting at least a portion of the gases released in the explosion.

DETAILED DESCRIPTION OF THE INVENTION

According to the invention, a process is provided for the production of plastic objects in which shredded plastic is introduced into a mold corresponding to the shape of the object to be produced, and this mold is then closed. An explosive combustible gas/oxygen gaseous mixture is introduced into the closed, loaded mold; and the gas mixture is thereby ignited, resulting in the development of sufficient pressure and temperature to provide conditions in the mold which permit the shredded plastic to be formed into a shaped object.

Using the process according to the invention, wherein a "metered" explosion is triggered in the mold, a plastic object can be configured to conform to the mold surface. In this explosive molding process, the edges and outside surfaces of the plastic grains contained in it are fused and baked to each other so that a stable plastic object results which can be removed from the mold after a certain cooling-off period.

In a preferred embodiment, a valve, connected with the inner space of the mold is provided to release excess pressure in the mold and to adjust the pressure and temperature in the mold. This embodiment is effective in maintaining the desired temperature and pressure in the mold.

In the operation of the process of the present invention, hydrogen, natural gas, propane, acetylene, and similar gases can be used as combustible gas. Pure oxygen or oxygen/air mixtures can be used as a source of oxygen. Depending on the type, amount, and composition of the plastic to be processed, a combustible gas-/oxygen gaseous mixture, generally even several such gaseous mixtures, can be used.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
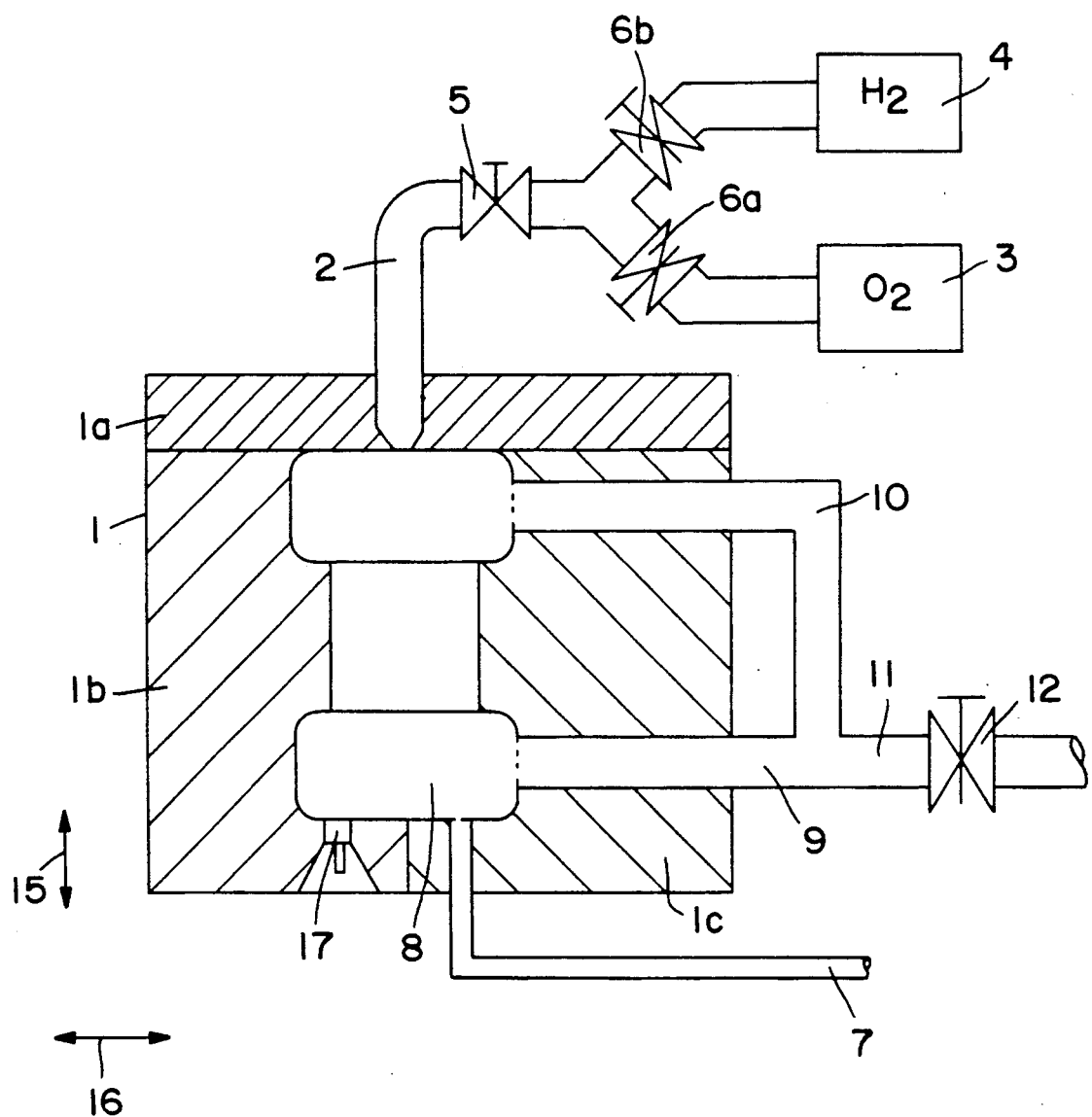
FIG. 1 is a sectional view showing of an apparatus for carrying out the process of the present invention.

FIG. 1 is a sectional view diagrammatically showing a device for performing the process according to the invention. A mold, shown generally at 1, is comprised of three parts (1a, 1b, and 1c) and can be supplied by a feed pipe 2 with a source of a combustible gas mixture, for example, hydrogen and oxygen. Since both gas sources 3, 4 are connected with the mold 1 via the feed pipe 2, a valve 5, and metering valves 6a, 6b, both process gases are mixed before they enter the mold. Shredded plastic is introduced into a hollow space 8 in the mold 1. The hollow space 8 is connected to discharge pipes 9, 10, which are in turn connected to a common continuation pipe 11 having an adjustable excess pressure valve 12 therein.

At the entrance to discharge lines 9 and 10 are permeable elements (shown by dotted lines) which are permeable to gases but impermeable to solids such as the shredded plastic being treated. Such permeable elements can be formed, for example, of perforated or porous metals, or by any other conventional means known in the art.

The process according to the present invention is carried out as follows: First, the open mold 1 first is partially closed, i.e., parts 1b and 1c of the mold are brought together according to arrow 16, and shredded, granular plastic is poured into the mold until the mold is completely filled. The material to be molded can include a mixture of different types of plastic, and even shredded waste plastic parts can be used. Preferred types of plastics to use in the process of the present invention include thermoplastics, such as polyethylene or polyamides, and duroplastics (thermosetting plastics) of different kinds. It is preferred that the mixture of different types of plastic contains more than 30% thermoplastic materials, preferably from about 50-100% by weight of thermoplastic materials.

Thereafter, according to arrow 15, the mold is completely closed by moving parts 1b and 1c into contact with the head part 1a. The proper amounts of the process gases are then introduced into the mold 8 by an opening valve 5, and the ratio of the amounts of the process gases is adjusted by means of metering valve 6a, 6b. The process gases are adjusted in about stoichiometric ratio, i.e., about 2 parts hydrogen to 1 part oxygen. The combustible gas and oxygen gas is fed to the mold cavity 8 until the adjusted explosive gas mixture has been distributed throughout the mold. This is achieved after feeding from about 0.5- to 2-times the volume of the mold hollow space 8 before closing the discharge pipe 7 and under a pressure of 0.1-4 bar, preferably 0.5-3 bar, of the combustible gas.

Advantageously, residual air or gas in the cavity 8 can be discharged or vented by a vent means, for example, a discharge pipe 7, connected to an end of hollow space 8 opposite to feed pipe discharge.

The explosive gas mixture, which is between the plastic granules and any space within cavity 8, is ignited by means of ignition means such as device 17, e.g., a spark plug. The thus-initiated reaction continues throughout the entire body of plastic, whereby the build-up of an undesirably high pressure is prevented by the release of excessive combustion gases by pressure release means such as discharge pipes 9, 10 in mold part 1c and related pressure relief valve 12.

Thus, the upper limit of the pressure prior to pressure release is dependent on the composition of the gaseous mixture used, as well as the strength of the mold. Generally, the pressures inside the mold after explosion are preferably in the range of 5-12, especially from 6-10 bar.

By discharging "explosion gases", optionally occurring in each production run, the build-up of excessively high temperatures in the mold is avoided because heat is removed with the exiting gases. The successful operation of the present process without destruction of the plastic is based, in part, on the small amount of the explosive gas mixture present between the shredded plastic grains and the fact that the heat liberated in the explosion closely matches that needed for softening and baking together the plastic grains or particles in the shape of the mold. In general, the temperatures achieved inside the mold are preferably 40°-140° C., and such temperatures are maintained preferably for about 5-60 seconds before the gas is released.

Thus, with a method appearing at first too "massive" for plastic, it has been surprisingly discovered that plastic articles with a not too filigrain structure can be produced, having properties suitable for many purposes, for example, as protection and ground plates, street and garden piles, etc.

Thus, the process of the present invention provides another possible method for producing plastic objects based on either homogenous materials and/or mixtures of materials.

The disclosures of all applications, patents and publications, cited above and below, if any, and of corresponding West German Application No. P 39 21 046.4, filed June 27, 1989, are hereby incorporated by reference.

In the context of this invention, the term "shredded" is meant to include any type of comminuting, e.g., by shredder, hammer mill, grinder, etc., which can be used to reduce the particle size of plastic materials. In this connection, it is preferred that the material fed to the mold be granular and preferably have a particle size of 0.5-10, especially 1-3 mm.

Without further elaboration, it is believed that one skilled in the art can, using the preceding description, utilize the present invention to is fullest extent. The following preferred specific embodiments are, therefore, to be construed as merely illustrative, and not limitative of the remainder of the disclosure in any way whatsoever.

EXAMPLE

A mold having a shape as shown in FIG. 1 [mold cavity 1(b)] is charged with shredded plastic comprising about 80 wt. % of thermoplastics (essentially polyethylene and polyvinyl chloride) and about 20 wt. % of duroplastics. The mold is then closed by moving mold 1(b) into contact with the stationary mold head 1(a), causing only a slight compression of the shredded plastic charge. A combustible gas mixture comprising hydrogen and oxygen in the volumetric ratio of 2:1 is then introduced through line 2 into the closed mold until the pressure in the mold is about 3 bar.

Residual air in the mold cavity is vented from the cavity when the combustible gases are first introduced into the closed mold cavity. A spark is then generated in the spark plug 17, causing detonation of the combustible gas mixture. The pressure in the mold immediately after the explosion is about 8 bar, and the temperature is between about 60°-80° C. during the approximately 10 second residence time of the ignited gases. As the pressure increases in the mold, pressure relief valve 12 opens, permitting combustion gases to escape from the mold via lines 9 and 10. The resulting plastic article having a dimension of about 4 cm$^3$ is formed by baking together the grains of the plastic (as opposed to melting and compression of the grains).

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of plastic objects from shredded plastic, comprising:
   introducing shredded plastic into a mold cavity corresponding to the shape of the object to to be produced and then closing the mold;
   introducing an explosive, combustible gas/oxygen gaseous mixture into the closed, loaded mold, and igniting the gaseous mixture, thereby generating sufficient heat and pressure from the combustion gases to bake and fuse together plastic grains in at least a portion of the shredded plastic and form a stable plastic object in the shape of the mold cavity; and controlling the temperature and pressure in the mold cavity by releasing combustion gases from the mold cavity during the explosion.

2. A process according to claim 1, wherein the explosive, combustible gas is acetylene, hydrogen, natural gas, or propane.

3. A process according to claim 1, wherein the oxygen source is air.

4. A process according to claim 1, wherein the oxygen source is a gas having oxygen in a higher concentration than air.

5. A process according to claim 1, wherein the composition of the explosive, combustible mixture is adjusted to provide sufficient heat and pressure to fuse edges and surfaces of the shredded plastic.

6. A process according to claim 1, wherein the shredded plastic is recycled plastic material.

7. A process according to claim 1, wherein the shredded plastic comprises different types of plastics.

8. A process according to claim 7 wherein the shredded plastic comprises thermoplastic materials.

9. A process for the production of plastic objects from recycled plastic which can comprise one or more types of plastic, the process comprising mixing the shredded plastic with an explosive mixture of gases in a mold cavity; detonating the explosive mixture to release sufficient heat to bake and fuse together plastic grains in at least a portion of the shredded plastic and form a plastic object in the shape of the mold cavity; and controlling the temperature and pressure in the mold cavity by releasing combustion gases from the cavity during the explosion.

10. The process of claim 9, wherein at least a portion of the plastic is thermoplastic.

11. An apparatus for the explosive forming of plastic articles from shredded plastic, comprising:
a mold having a source of combustible gas mixture in communication with the mold cavity;
means permeable to gas but not solide in communication with the mold cavity;
pressure release means in communication with the mold cavity for venting excess combustion gases from the mold cavity and for controlling the temperature and pressure of the mold cavity during an explosion in the mold; and
ignition means for igniting the explosion of the combustible gas mixture.

12. The apparatus of claim 11, further comprising vent means communicating with the mold cavity to vent to the atmosphere residual gases from the mold cavity.

13. The apparatus of claim 11, wherein the pressure release means includes an pressure relief valve.

14. The apparatus of claim 13, wherein the pressure release means includes one or more pipes in communication with said means permeable to gas but not solide in communication with the mold cavity.

15. The apparatus of claim 11, wherein the source of the combustible gas mixture comprises a source of oxygen and a source of another gas which forms an explosive mixture when combined with oxygen.

16. The apparatus of claim 11, wherein the mold is formed of detachable parts to facilitate loading the shredded plastic in the mold cavity.

17. A process according to claim 1, wherein the gaseous mixture comprises a stoichiometric ratio of combustible gas to oxygen of about 2 to 1.

18. A process according to claim 1, wherein the gaseous mixture comprises from about 0.5 to 2 times the volume of the mold cavity.

19. A process according to claim 17, wherein the pressure of the gaseous mixture is from about 0.1–4 bar.

20. A process according to claim 1, wherein upon detonation, the combustion gases reach a pressure of from about 5–12 bar and a temperature of from about 40–140° C.

21. A process according to claim 1, wherein the shredded plastic comprises more than about 30 wt. % or thermoplastic materials.

22. The apparatus of claim 11, wherein the means permeable to gas but not solids comprises perforated or porous metals.

* * * * *